(12) United States Patent
Perlman et al.

(10) Patent No.: US 12,288,214 B2
(45) Date of Patent: Apr. 29, 2025

(54) SECURE, LOW-COST, PRIVACY-PRESERVING BIOMETRIC CARD

(71) Applicant: EMC IP Holding Company LLC, Hopkinton, MA (US)

(72) Inventors: Radia J. Perlman, Redmond, WA (US); Charles W. Kaufman, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 25 days.

(21) Appl. No.: 17/160,166

(22) Filed: Jan. 27, 2021

(65) Prior Publication Data

US 2022/0237623 A1 Jul. 28, 2022

(51) Int. Cl.
*G06Q 20/00* (2012.01)
*G06Q 20/34* (2012.01)
*G06Q 20/38* (2012.01)
*G06Q 20/40* (2012.01)
*G06V 40/50* (2022.01)

(52) U.S. Cl.
CPC ....... *G06Q 20/40145* (2013.01); *G06Q 20/34* (2013.01); *G06Q 20/382* (2013.01); *G06V 40/50* (2022.01); *G06V 40/53* (2022.01)

(58) Field of Classification Search
CPC .. G06Q 20/382; G06Q 20/34; G06Q 20/4014; G06Q 20/40145; G06V 40/50; G06V 40/53
See application file for complete search history.

(56) References Cited

U.S. PATENT DOCUMENTS

| | | | | |
|---|---|---|---|---|
| 6,725,383 B2* | 4/2004 | Kyle | ...................... | G06V 40/16 713/182 |
| 8,428,970 B1* | 4/2013 | Fiferlick | ................ | G16H 10/60 705/3 |
| 8,694,793 B2* | 4/2014 | Evans | .................. | G07F 7/1008 726/20 |
| 2003/0217294 A1* | 11/2003 | Kyle | ....................... | G07C 9/38 713/186 |
| 2004/0064453 A1* | 4/2004 | Ruiz | ...................... | G07C 9/257 707/999.009 |
| 2004/0172558 A1* | 9/2004 | Callahan | ................ | G16H 30/20 709/229 |
| 2005/0054438 A1* | 3/2005 | Rothschild | .......... | G07F 17/3239 463/29 |
| 2005/0122209 A1* | 6/2005 | Black | ................. | G06Q 20/4014 340/5.4 |

(Continued)

OTHER PUBLICATIONS

Biometrics to Control ATM scams: a study, IEEE (Year: 2014).*
An Effective Cardless Atm Transaction Using Computer Vision Techniques, IEEE (Year: 2023).*

*Primary Examiner* — Bruce I Ebersman
(74) *Attorney, Agent, or Firm* — Workman Nydegger (57) ABSTRACT

One example method includes generating a biometric of a user, requesting, and receiving, biometric data from a card, comparing the biometric data with the biometric, and when the biometric data matches data of the biometric, authorizing a transaction requested by a user using the card. The request for biometric data may identify what particular type of biometric data is compatible with the device making the request, and the biometric data may be a subset of the data that makes up the biometric.

14 Claims, 3 Drawing Sheets

(56) References Cited

U.S. PATENT DOCUMENTS

| | | | | |
|---|---|---|---|---|
| 2006/0213970 | A1* | 9/2006 | Trajkovic | G06F 21/34 235/382 |
| 2007/0136792 | A1* | 6/2007 | Ting | G06F 21/32 726/5 |
| 2007/0220272 | A1* | 9/2007 | Campisi | G06Q 20/40145 713/186 |
| 2008/0005578 | A1* | 1/2008 | Shafir | G07C 9/37 713/186 |
| 2008/0028230 | A1* | 1/2008 | Shatford | H04L 9/3231 713/186 |
| 2008/0120509 | A1* | 5/2008 | Simon | G06Q 20/341 713/186 |
| 2009/0201128 | A1* | 8/2009 | Campisi | G06Q 20/3674 713/186 |
| 2009/0212902 | A1* | 8/2009 | Haddock | G07C 9/257 340/5.2 |
| 2010/0038418 | A1* | 2/2010 | Fomitchev | G06Q 40/02 235/379 |
| 2012/0023422 | A1* | 1/2012 | Biton | G06K 19/07703 715/764 |
| 2014/0210589 | A1* | 7/2014 | Grace | G06F 21/34 340/5.51 |
| 2016/0224773 | A1* | 8/2016 | Ramaci | G07C 9/27 |
| 2016/0247161 | A1* | 8/2016 | Wang | G06Q 20/4012 |
| 2017/0140369 | A1* | 5/2017 | Choi | G06Q 20/3223 |
| 2018/0173935 | A1* | 6/2018 | Sanni | G06Q 20/40145 |
| 2018/0268414 | A1* | 9/2018 | Chung | G06Q 20/409 |
| 2018/0285556 | A1* | 10/2018 | Beatson | G06F 21/45 |
| 2019/0080330 | A1* | 3/2019 | Schipperheijn | H04L 9/3228 |
| 2019/0139051 | A1* | 5/2019 | Kopf | G06Q 20/204 |
| 2019/0294940 | A1* | 9/2019 | Rodriguez Bravo | G06K 19/07709 |
| 2020/0013032 | A1* | 1/2020 | Moskowitz | G06Q 20/105 |
| 2020/0104855 | A1* | 4/2020 | Bruno | G06Q 20/40145 |
| 2021/0035109 | A1* | 2/2021 | Wong | G07F 7/0833 |
| 2021/0408829 | A1* | 12/2021 | Lee | H02M 3/158 |

* cited by examiner

SECURE, LOW-COST, PRIVACY-PRESERVING BIOMETRIC CARD

FIELD OF THE INVENTION

Embodiments of the present invention generally relate to the use of biometrics. More particularly, at least some embodiments of the invention relate to systems, hardware, software, computer-readable media, and methods for the use of biometrics in connection with transaction authorizations.

BACKGROUND

While various approaches have been devised in an attempt to improve the security of transactions, problems nonetheless remain. For example, some credit cards have visual information for the clerk to verify, such as a signature or a photo for example. However, a signature may be relatively easy to forge and may likely be successful in deceiving a clerk who is in a hurry and may not be educated about signature verification. As well, the small grainy photos typically found on identification cards and some credit cards pose little difficulty for a thief or other unauthorized use of the card, since it may be a simple matter for the thief to find a friend that looks approximately the same as the person in the photo on the stolen card. An untrained clerk, who may be in a hurry, is unlikely to perceive any significant differences between the person who presented the card and the person whose picture appears on that card.

In recognition of problems such as these, various approaches involving the use of biometrics in transactions have been developed. However, conventional biometrics approaches have proven problematic. For example, facial recognition systems can be useful in some applications. However, facial recognition systems require a camera to generate and send an image to a cloud that will perform facial recognition against its database. That is, the biometrics data must be generated, then transmitted offsite for processing, and stored. This approach raises privacy concerns with regard to the collection, transmission, and storage, of personal data. A related concern is that this approach requires connectivity between the biometrics data generator, that is, the camera, and the remote site where processing and storage occur. If this connectivity is not established, or established in an untimely manner, then the associated transaction may not be able to be fulfilled.

There are also biometric mechanisms for unlocking a local device, such as face recognition or fingerprint reader on an iPhone. This implementation of a biometric mechanism requires an expensive device, that is, the mobile phone, with a biometric input device, such as a camera. As well, although there are cards that include electronic chips, such chips are typically employed, in the United States for example, as an anti-cloning security feature. Outside the United States, the POS (point of sale) typically requires a PIN (personal identification number), and if too many wrong guesses are made, the chip on the card will lock itself up.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to the use of biometrics. More particularly, at least some embodiments of the invention relate to systems, hardware, software, computer-readable media, and methods for the use of biometrics in connection with transaction authorizations.

In general, example embodiments of the invention embrace a system and method for creation and use of a card on which biometric data may be encoded. Biometrics, such as an image of a face, a retina scan image, or a fingerprint, for example, may be unique to the authorized user of the card. In some embodiments, the card does not include any visible biometrics such as photos, or fingerprints.

The card may be used with any of a variety of transactions, which may or may not be commercial in nature. In one illustrative example involving a POS (point of sale) terminal, the POS terminal may comprise one or more biometric devices that may perform operations such as obtaining one or more biometrics from a user of the card encoded with biometric data. Such biometric devices may include, for example, a fingerprint reader, a camera, a retina scanning device, or any other device operable to obtain one or more biometrics from a user.

After, or before, having obtained one or more biometrics from the user, the biometric device may communicate with the card to identify, to the card, which particular type(s) of biometric data the biometric device is capable of handling. For example, if the biometric device comprises a camera, but does not have a fingerprint reader or iris scanner, the biometric device may communicate to the card that it is only capable of evaluating biometrics such as can be gathered with a camera, such as a facial scan for example. The capabilities of the biometric device may be communicated to the card at the same, or a different, time that the biometric device requests compatible biometric data from the card. In response, the card may send one or more compatible sets of biometric data to the biometric device at the POS.

The biometric data sent by the card may be all, or a subset, of the biometric data encoded on the card. In some embodiments, there are no biometrics, such as a facial photo or fingerprint, actually stored on the card. In such embodiments, only a subset of the biometric data that makes up a biometric is encoded on the card. For example, the biometric data may consist only of a measurement of the distance between the eyes, and a measurement of the distance from the eyes to the nose.

The biometric data encoded on the card may be sufficient to eliminate a large percentage, such as about 99 percent for example, of the population as possible matches with that biometric data. Thus, there may be a relatively low probability that a person other than the authorized user would be authorized to use the card.

In some cases, the biometric data encoded on the card may be sufficient to uniquely identify the user while, in other cases, the encoded biometric data may not be sufficient to uniquely identify the user.

As another example, the biometric data encoded on the card may be sufficient to uniquely correspond to, though not necessarily identify, the user. To illustrate, the biometric data may be sufficient to enable determination of a userID that uniquely corresponds to the user, but which does not reveal the identity of the user.

In any case, the encoded biometric data may be such that it cannot be used to construct the biometric, such as a facial photo, from which the biometric data was taken. Finally, the biometric data sent by the card may be randomly selected by the card. In other embodiments, one or more biometrics may be encoded on the card.

The biometric device may then compare the biometric data received from the card with the biometric data gathered by the biometric device. If there is a match, then the transaction requested by the user with the card may be authorized by the POS terminal, and if there is no match, then the transaction requested by the user with the card may be canceled by the POS terminal.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment of the invention may eliminate transmission of biometric data to a remote site for an authorization process. An embodiment of the invention may eliminate persistent storage of biometric data gathered by a biometric device. An embodiment of the invention may provide a card with encoded biometric data that uniquely identifies an authorized user, but which are not intelligible by a human. An embodiment of the invention may implement secure POS authorization at a relatively low cost. An embodiment of the invention may enable user authentication with a subset of the biometric data that are stored on a card. An embodiment of the invention may provide acceptable authentication performance even with a relatively high percentage of false positives and/or false negatives.

A. Aspects of an Example Architecture and Environment

Figure 1:
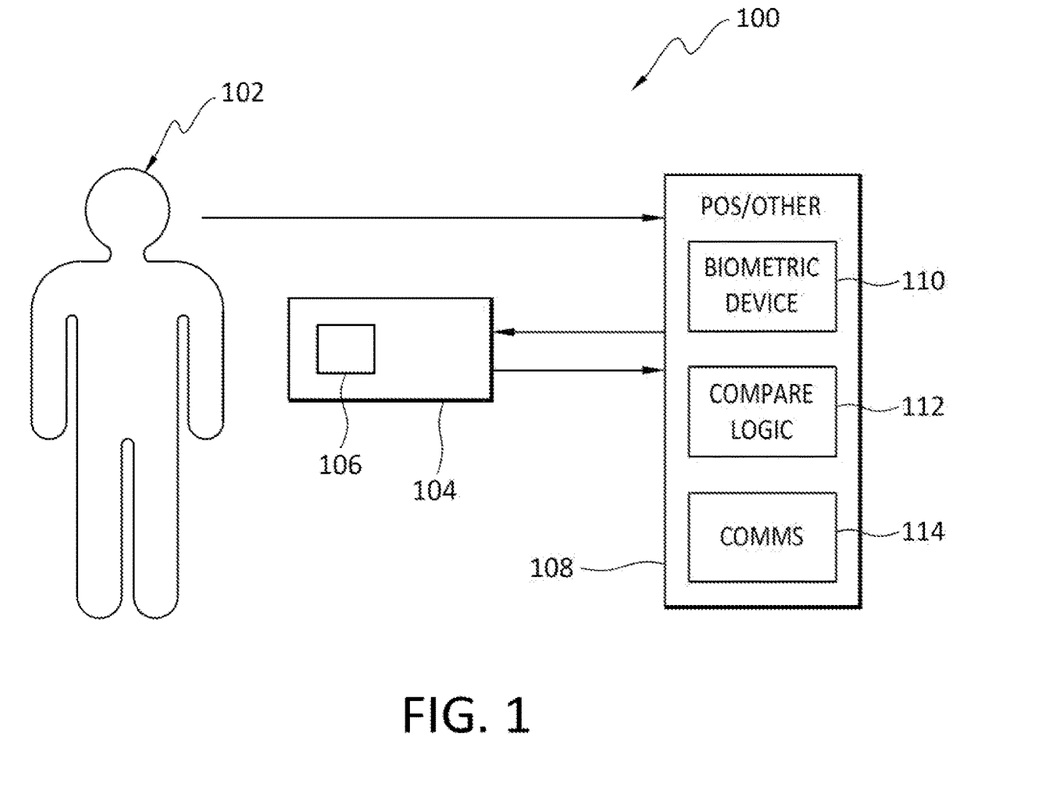
FIG. 1 discloses aspects of an example operating environment for some embodiments of the invention.

With reference now to FIG. 1, an operating environment 100 is disclosed in connection with which one or more embodiments of the invention may be implemented. In general, the operating environment 100 may comprise a user 102, such as a human for example, a card 104 with encoded biometric data 106 of the user 102, and a device 108, such as a POS terminal for example, configured to perform an authentication process with the card 104 and enable a transaction to take place upon successful authentication of the user 102.

Note that as used herein, a 'transaction' is broad in scope and may embrace any process in which one or more particulars acts, by a human user 102, is/are enabled. Such acts may include, but are not limited to, use of a credit card or debit card to make a purchase at a POS terminal, obtain cash from an ATM, access to a locked area, access to a locked physical device, access to a computing system, admission to a venue, admission to a restricted area such as an aircraft boarding area, or access to data and/or information.

Further, as used herein, a 'biometric' refers to a dataset that is generated by a biometric device and which comprises data about one or more physical attributes of a user. Such data is referred to herein as 'biometric' data and may comprise all of the data of a biometric, or may comprise only a subset of all the data contained in a biometric. Thus, example biometrics include, but are not limited to, a photograph of the face of a user, a scan of a fingerprint of a user, and a scan of the retina of a user. These biometrics may be generated by biometric devices such as a camera, fingerprint scanner, or retina scanner, for example.

In brief, the example components of FIG. 1 may operate generally as follows. When the user 102 is using the card 104, the card 104 may choose a random subset of biometric data 106 consistent with a request issued by the device 108, and sends that biometric data 106 to the device 108. The device 108 may then verify the received biometric data 106 against the inputted biometric, that is, the biometric generated by the device 108, and the device 108 may then indicate, for example, that 'YES' the requested transaction is authorized, or 'NO' the requested transaction is not authorized, and denied. Some embodiments of the card 104 may be configured such that after the device 108 indicates 'NO' to the card 104, the card 104 may lock itself up, either for an amount of time, or permanently until the bank or other authority sends the user 102 some sort of PIN or other access code to unlock the card 104.

Even if a thief were able to extract the complete set of biometric data 106 from the card 104, that biometric data 106 would be unintelligible to a human, unlike an actual photo. In other words, it would be difficult for the thief to reverse engineer the biometric data 106 in order to find an accomplice whose features were sufficiently well matched with the biometric data 106 as to enable a fraudulent transaction.

A system according to example embodiments may be very low cost, since the POS machine, or other device, does not need to be particularly sophisticated nor have substantial memory or computing resources. Rather, the device only has to spot check biometric data from one, or only a few, randomly selected biometrics.

With continued reference to FIG. 1, the biometric data 106 extracted from one or more biometrics of the user 102 may be encoded onto the card 104. Such biometric data 106 may concern any one or more attributes unique to the user 102, and such attributes may comprise, for example, fingerprints, handprints, footprints, retinal features, dental features, facial features, voice patterns, and DNA.

The card 104 may be similar in size and construction to a conventional credit card or debit card. The biometric data 106 on the card 104 may be obtained through the use of biometric devices, such as a retina scanner for example, and then stored on the card 104 to be read out later. Thus, the card 104 may have a WORM (write once, read many) memory configuration, although that is not necessarily required. The card 104 may be configured with various components, such as an embedded processor, memory, and communication device. In one example embodiment, the memory device may be implemented, for example, as readable magnetic or optical media configured to store biometric data 106 and to enable the readout of the biometric data 106, such as by an external system or device 108. The card 104 may be configured to communicate random subsets of the biometric data 106 each time the card 104 is queried by the external system or device 108. In some embodiments, the card 104 may be configured so that biometric data 106 encoded on the card 104 cannot be changed once initial encoding has been performed. In other embodiments, the card 104 may be configured so that biometric data 106 encoded on the card 104 may be erased, and possibly replaced with other biometric data of the user. In any embodiment, the biometric data 106 encoded on the card 104 may be encrypted. In any embodiment, the card 104 may be configured such that the encoded biometric data on the card 104 is not visually apparent.

With continued reference to FIG. 1, the example device 108 may comprise a conventional POS terminal, although that is not required. For example, the device 108 may alternatively comprise a badge reader, ATM (automated teller machine), or ID checkpoint. As another example, the device 108 may comprise a lock that can open when requested by an authorized user 102 for example. In any case, the example device 108 may comprise a biometric device 110 configured and operable to obtain the biometric data 106 from the user 102. The biometric device 110 may comprise volatile memory for temporary storage of the biometric data 106 of the user 102. In general, the biometric device 110 may be any device that is configured and operable to obtain biometric data 106 of any kind from the user 102.

The device 108 may also comprise compare logic 112 which, when executed by a hardware processor, performs a compare operation that compares the biometric data 106 with biometric data gathered by the biometric device 110. Depending upon the outcome of the compare operation, the compare logic 112 may next issue an 'authorized' or 'not authorized' indication and may, correspondingly, enable or prevent the transaction requested by the user 102.

A communication device 114 in the device 108 may enable the device 108 to communicate with the card 104 to request, and obtain, the biometric data 106 from the card 104. For example, the communication device 114 may read optical or magnetic media on the card 104 to obtain the biometric data 106. In another embodiment, the communication device 114 may communicate wirelessly with the card 104 to request and obtain the biometric data 106. No particular mode of communication between the card 104 and device 108 is required however.

B. Aspects of Some Example Embodiments

With the discussion of the example operating environment 100 in view, attention is directed now to further aspects of some example embodiments. In general, embodiments of the invention embrace, but are not limited to, a relatively low cost implementation that may enable automatic verification of biometric data, such as by a POS device, by a chip on a card, or by a remote machine, for example.

Embodiments of the invention may, for example, enhance the security of credit card and credential use without impacting ease of use, privacy, or adding significant cost to the system. Cards according to example embodiments may cost about the same, and may function in the same way, as conventional credit cards and debit cards, and as such, cards according to example embodiments may not include biometric devices such as fingerprint readers or cameras, that as may be found in devices such as mobile phones.

Further, if a thief were to steal a card that was configured according to example embodiments, the thief would not have enough information to impersonate the biometric from which the biometric data on the card was obtained. That is, the card may, by design, not have enough encoded biometric data to enable a bad actor to reconstruct the biometric associated with that biometric data, and the card may also lack visible biometrics, such as a photo or signature displayed on the card, for example. This approach may prevent a thief, who may have a stolen card and a POS device, from trying various accomplices to see if any of them have biometrics sufficiently close to the biometrics of the user to be able to pass an authentication process. Moreover, even if a thief were to use accomplices to pass an authentication process once against a machine, embodiments of the invention employ random sets of biometric data and, as such, it may be highly unlikely that the same accomplice can pass the authentication test again, whether with the stolen POS device or another device.

Example embodiments may preserve the privacy of the user and user-specific data insofar as such embodiments may not store the actual biometric, such as a photo for example, anywhere. Rather, the biometric data stored on the card may be only a subset of all the biometric data that makes up the biometric. As well, the biometric data encoded on the card may not be stored anywhere but on the card. Such an approach may be relatively secure since a bad actor such as a thief cannot obtain enough information from the card to enable impersonation of the user whose biometric data is encoded on the card. This may be true even if the thief has an opportunity, for example, to do unlimited tests to see if a particular accomplice will pass the biometric test.

Embodiments of the invention may would encode biometric data on the card. Rather than a biometric such as a photo of a face, or an actual fingerprint, the card would encode biometric data associated with various biometrics. When using a device, such as a POS terminal for example, the biometric measurement device of the POS may send a request to the card, specifying which subset of biometric data it can handle and, in response to the request, the POS may then receive a set of biometric data from the card. The received biometric data may then be verified against the biometric measurement taken by the POS device.

The card may have a large set of biometric data, respective portions of which may each correspond to a particular biometric of the user to whom the card was issued. When a request is made by the POS machine, with the request saying which types of biometric the POS machine is equipped to measure, the card eliminates biometric data that do not fulfill the request, and sends a small randomly chosen set of the remaining biometric data to the POS machine. The POS machine may generate multiple different biometrics of a user, and may request biometric data for all of those biometrics, or a subset of the biometrics. Further details concerning some example methods according to various embodiments of the invention are disclosed elsewhere herein.

Even if a thief were to have a stolen POS terminal or other device, or sneaks into a store after hours, the thief may have an unlimited number of attempts to try and find a friend that will fool the POS terminal using the card. However, since the card sends only a random subset of biometric data to the POS machine, even if someone manages to convince a POS once, because the offered biometric data happens to match the random set of parameters offered to the POS in the test, there is no guarantee that the same person will be able to pass a different test, because the random subset of biometric data will be different each time the POS queries the card.

Finally, to keep the cost of the POS, or other device, low, the biometric measurement, and the comparison against biometric data encoded on the card may be relatively low quality. For example, the biometric data may support a fairly high proportion of false positives, such as about 10% of all queries for example, since the downside of being caught is so high for the thief. That is, the disincentive to the thief is sufficiently significant that the thief may be unlikely to make enough attempts to give rise to the possibility of a false positive. For example, a thief may only make 1, or possibly 2, attempts to undertake a fraudulent transaction, given the relatively high likelihood, possibly about 90%, that a fraudulent attempt will be detected. The biometric data may also support a fairly high proportion of false negatives, such as about 10% of all queries for example, as long as a second trial is allowed, so as not to prevent a genuine transaction.

As will be apparent from this disclosure, example embodiments of the invention may, but are not required, to possess various characteristics. For example, one or more embodiments may employ biometric data encoded on a relatively inexpensive, credit-card like device, in a way that is not human-intelligible. As another example, one or more embodiments may provide for a device, such as a POS terminal, that is able to specify which types of biometric data it can deal with, such that a card that receives a request from the device will select the card select only biometric data of the type(s) identified by the device. In a further example, some embodiments may provide a card that is configured to choose, such as in response to a request from a device, a random subset of relevant biometric data to send to the device as part of a transaction. As a final example, some embodiments may provide for a device that is able to verify biometric data received from a card against a user biometric generated, such as with a camera, by the device.

C. Example Methods

Figure 2:
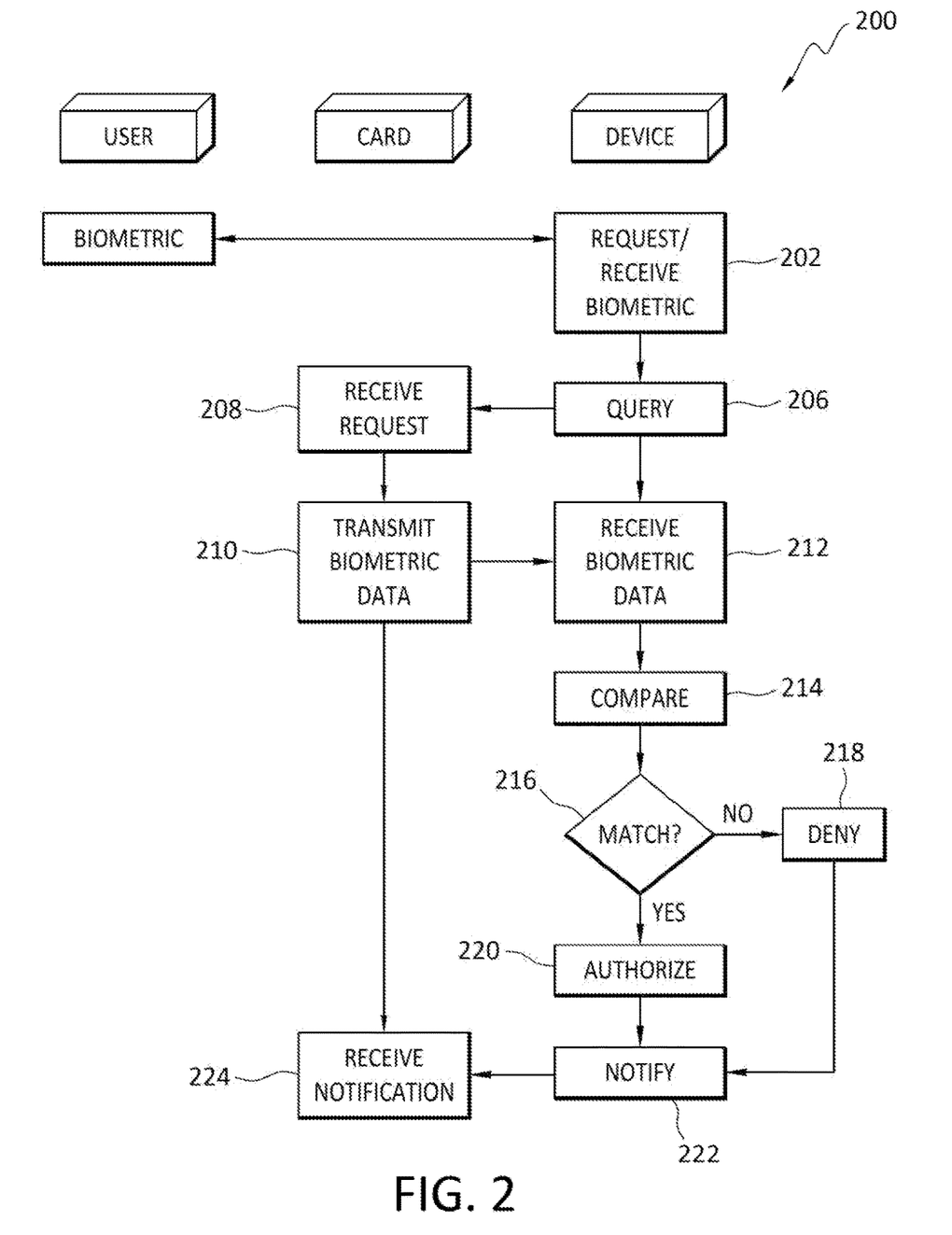
FIG. 2 discloses aspects of methods for implementing biometric processes.

It is noted with respect to the example method of FIG. 2 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 2, an example method 200 is disclosed. In some embodiments, the method 200 may be cooperatively performed by a user, card, and a device that includes a biometric device. The functional assignments indicated in FIG. 2 are provided by way of example, and may be different in other embodiments.

The method 200 may begin when a biometric device, which may be an element of a POS terminal or other device, requests 202 one or more biometrics from a user. The user may provide 204 the requested biometric(s) to the biometric device. Examples of various biometrics are disclosed elsewhere herein and may include, for example, a photo, fingerprint, or iris scan.

The biometric device may then query 206 the card to request biometric data. The card may receive 208 the query and transmit 210 biometric data indicated in the query 206 as being compatible with the biometric device. The biometric data that is transmitted 210 may be a random set of biometric data that has been encoded onto the card.

The biometric device may then receive 212 the requested, compatible, biometric data and perform a compare operation 214. In particular, the biometric device may compare the biometric data received 212 from the card, with the biometric that was obtained 202 from the user. If the received 212 biometric data is determined 216 not to match the biometric, then the requested transaction may be denied 218. On the other hand, if it is determined 216 that the received 212 biometric data matches the biometric, then the requested transaction maybe authorized 220, and a notification sent 222 to the card. The card may then receive 224 the notification that the transaction has been authorized. In some embodiments, the denial 218 or authorization 220, as applicable, may be displayed to the user by a device such as a POS terminal for example.

D. Further Example Embodiments

Following are some further example embodiments of the invention. These are presented only by way of example and are not intended to limit the scope of the invention in any way.

Embodiment 1. A method, comprising: generating a biometric of a user; requesting, and receiving, biometric data from a card; comparing the biometric data with the biometric; and when the biometric data matches data of the biometric, authorizing a transaction requested by a user using the card.

Embodiment 2. The method as recited in embodiment 1, wherein the biometric data is sufficiently sparse that an identity of the user cannot be derived from the biometric data.

Embodiment 3. The method as recited in any of embodiments 1-2, wherein the biometric data is a subset of the data of the biometric.

Embodiment 4. The method as recited in any of embodiments 1-3, wherein the received biometric data comprises a randomly selected subset of biometric data encoded on the card.

Embodiment 5. The method as recited in any of embodiments 1-4, wherein when the biometric data matches data of the biometric, further comprising transmitting a notification that the transaction has been authorized.

Embodiment 6. The method as recited in any of embodiments 1-5, wherein requesting the biometric from the card comprises identifying, to the card, a type of biometric data that is consistent with a nature of a device that generated the biometric.

Embodiment 7. The method as recited in any of embodiments 1-6, wherein the card does not include any visible biometrics of the user.

Embodiment 8. The method as recited in any of embodiments 1-7, wherein the biometric is not persistently stored anywhere.

Embodiment 9. The method as recited in any of embodiments 1-8, wherein the biometric data is not persistently stored anywhere except on the card.

Embodiment 10. The method as recited in any of embodiments 1-9, wherein the biometric data encoded on the card comprises respective biometric datasets for each of a plurality of biometrics of the user.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
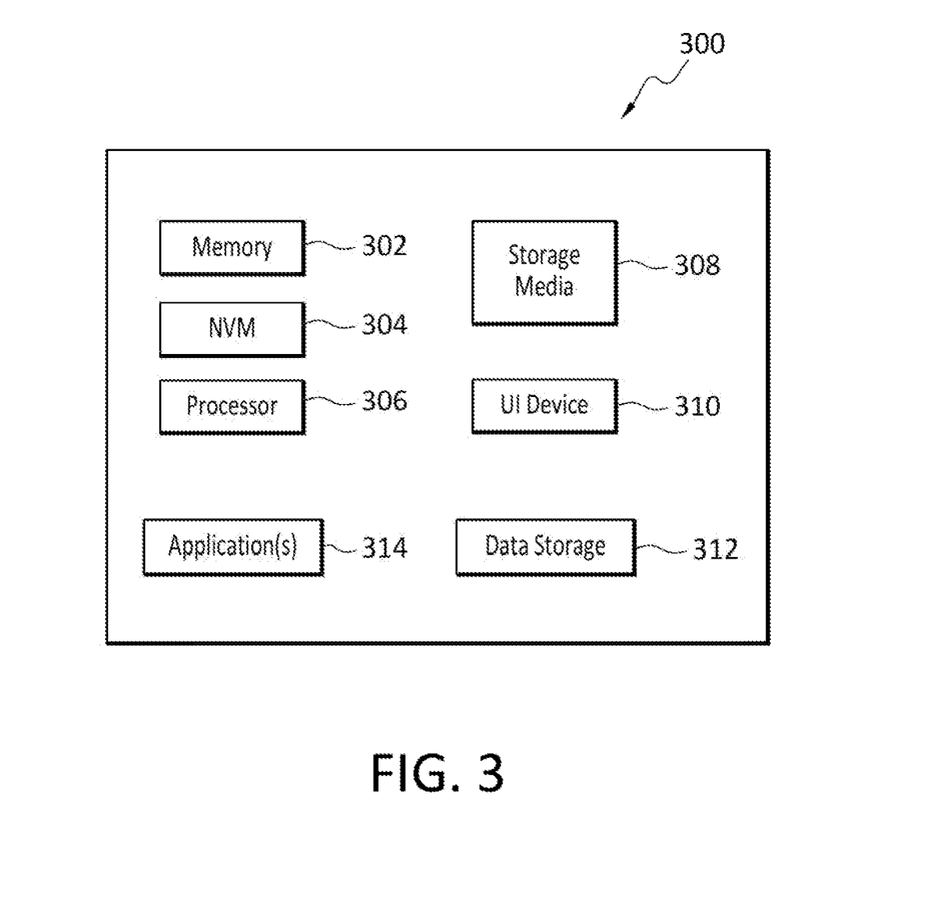
FIG. 3 discloses aspects of a computing entity configured and operable to perform any of the disclosed processes and methods.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI (user interface) device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving, by a device, a biometric from a user to generate first biometric data;

after the first biometric data is generated, sending, by the device, a request for second biometric data from a card, wherein the request includes a type of the first biometric data generated by the device;

randomly selecting and sending to the device, by the card, a subset of second biometric data, wherein the second biometric data comprises data that remains in the card after elimination of biometric data which is stored in the card but does not fulfill the type of the first biometric data in the request;

comparing the randomly selected subset of the second biometric data with the first biometric data;

when the randomly selected subset of the second biometric data matches the first biometric data, authorizing a transaction requested by a user using the card; and when the randomly selected subset of the second biometric data does not match the first biometric data, denying the transaction request by the user using the card and locking the card, wherein comparing the randomly selected subset of the second biometric data results in determining that an identity of the user cannot be derived from the randomly selected subset of the second biometric data, and wherein the second biometric data encoded on the card comprises respective biometric datasets for each of a plurality of biometrics of the user.

2. The method as recited in claim 1, wherein the randomly selected subset of the second biometric data includes all of the biometric data encoded on the card.

3. The method as recited in claim 1, wherein the randomly selected subset of the second biometric data is encoded on the card.

4. The method as recited in claim 1, wherein when the randomly selected subset of the second biometric data matches data of the biometric, further comprising transmitting a notification that the transaction has been authorized.

5. The method as recited in claim 1, wherein the card does not include any visible biometrics of the user.

6. The method as recited in claim 1, wherein the first biometric data is not persistently stored anywhere.

7. The method as recited in claim 1, wherein the second biometric data is not persistently stored anywhere except on the card.

8. A non-transitory storage medium having stored therein instructions that are executable by one or more hardware processors to perform operations comprising:

receiving, by a device, a biometric from a user to generate first biometric data;

after the first biometric data is generated, sending, by the device, a request for second biometric data from a card, wherein the request includes a type of the first biometric data generated by the device;

randomly selecting and sending to the device, by the card, a subset of second biometric data, wherein the second biometric data comprises data that remains in the card after elimination of biometric data which is stored in the card but does not fulfill the type of the first biometric data in the request;

comparing the randomly selected subset of the second biometric data with the first biometric data;

when the randomly selected subset of the second biometric data matches the first biometric data, authorizing a transaction requested by a user using the card; and when the randomly selected subset of the second biometric data does not match the first biometric data, denying the transaction request by the user using the card and locking the card, wherein comparing the randomly selected subset of the second biometric data results in determining that an identity of the user cannot be derived from the randomly selected subset of the second biometric data, and wherein the second biometric data encoded on the card comprises respective biometric datasets for each of a plurality of biometrics of the user.

9. The non-transitory storage medium as recited in claim 8, wherein the randomly selected subset of the second biometric data includes all of the biometric data encoded on the card.

10. The non-transitory storage medium as recited in claim 8, wherein the randomly selected subset of the second biometric data is encoded on the card.

11. The non-transitory storage medium as recited in claim 8, wherein when the randomly selected subset of the second biometric data matches data of the biometric, further comprising transmitting a notification that the transaction has been authorized.

12. The non-transitory storage medium as recited in claim 8, wherein the card does not include any visible biometrics of the user.

13. The non-transitory storage medium as recited in claim 8, wherein the first biometric data is not persistently stored anywhere.

14. The non-transitory storage medium as recited in claim 8, wherein the second biometric data is not persistently stored anywhere except on the card.

* * * * *